US008699409B2

United States Patent
Aryan et al.

(10) Patent No.: US 8,699,409 B2
(45) Date of Patent: Apr. 15, 2014

(54) METHODS AND APPARATUSES FOR PROVIDING PEER-TO-PEER POSITIONING IN WIRELESS NETWORKS

(75) Inventors: Babak Aryan, San Diego, CA (US); Seung-Hyun Kong, San Diego, CA (US); Wenhui Xiong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 733 days.

(21) Appl. No.: 12/420,637

(22) Filed: Apr. 8, 2009

(65) Prior Publication Data

US 2010/0260150 A1 Oct. 14, 2010

(51) Int. Cl.
*H04W 4/00* (2009.01)

(52) U.S. Cl.
USPC ............... 370/328; 455/456.1; 455/456.2; 455/456.5; 455/456.6; 370/310

(58) Field of Classification Search
USPC .......... 455/456.1, 456.2, 456.3, 456.4, 456.5, 455/456.6
See application file for complete search history.

(56) References Cited

U.S. PATENT DOCUMENTS

| | | | | |
|---|---|---|---|---|
| 5,508,708 | A * | 4/1996 | Ghosh et al. | 342/457 |
| 6,285,316 | B1 * | 9/2001 | Nir et al. | 342/357.46 |
| 6,353,604 | B2 * | 3/2002 | Grimwood et al. | 370/335 |
| 6,504,503 | B1 * | 1/2003 | Saint-Hilaire et al. | 342/357.25 |
| 6,519,464 | B1 | 2/2003 | Santhoff et al. | |
| 7,084,809 | B2 | 8/2006 | Hockley, Jr. et al. | |
| 2002/0155845 | A1 * | 10/2002 | Martorana | 455/456 |
| 2004/0203900 | A1 * | 10/2004 | Cedervall et al. | 455/456.1 |
| 2006/0267841 | A1 | 11/2006 | Lee et al. | |
| 2007/0123255 | A1 * | 5/2007 | Chae | 455/434 |
| 2007/0167139 | A1 * | 7/2007 | Inano et al. | 455/88 |
| 2010/0226308 | A1 * | 9/2010 | Haverty | 370/328 |

FOREIGN PATENT DOCUMENTS

| | | |
|---|---|---|
| CN | 1486577 A | 3/2004 |
| CN | 101371611 A | 2/2009 |
| EP | 1263255 | 12/2002 |
| JP | 2003057326 A | 2/2003 |
| JP | 2004516463 A | 6/2004 |
| WO | WO-2007087170 A1 | 8/2007 |

OTHER PUBLICATIONS

International Search Report and Written Opinion—PCT/US2010/030198, International Search Authority—European Patent Office—Aug. 24, 2010.

\* cited by examiner

*Primary Examiner* — Kibrom T Hailu
*Assistant Examiner* — James P Duffy
(74) *Attorney, Agent, or Firm* — Jennifer M. Pascua

(57) ABSTRACT

Methods and apparatus are provided for use in wireless networks to provide and/or otherwise support peer-to-peer positioning operations.

36 Claims, 9 Drawing Sheets

METHODS AND APPARATUSES FOR PROVIDING PEER-TO-PEER POSITIONING IN WIRELESS NETWORKS

BACKGROUND

1. Field

The subject matter disclosed herein relates to electronic devices and more particularly to methods and apparatuses for use in electronic devices for use in wireless communication systems.

2. Information

Wireless communication systems and devices are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity between a plethora of devices, both fixed and portable. Many of these wireless systems are coupled together through other communication systems and resources to promote even more communication and sharing of information. Indeed, it is not uncommon for some devices to communicate with more than one wireless communication system and this trend appears to be growing.

Another popular and increasingly important wireless technology includes navigation systems and devices and in particular satellite positioning systems (SPS) such as, for example, the Global Positioning System (GPS) and other like Global Navigation Satellite Systems (GNSS). An SPS receiver, for example, may receive wireless SPS signals that are transmitted by a plurality of orbiting satellites of a GNSS. The SPS signals once received may be processed, for example, to determine a global time, an approximate geographical location, altitude, and/or speed associated with a device having the SPS receiver path, such as, for example a cellular telephone.

Other positioning techniques are also known and available for use in locating a mobile device such as a cellular telephone within the coverage area of a wireless network. For example, various signaling/timing techniques may be employed to determine or otherwise estimate the location of the cellular telephone based on trilateration and/or other like processes.

SUMMARY

Methods and apparatus are provided for use in peer-to-peer positioning operations in wireless networks.

By way of example, in accordance with certain aspects, a method may be implemented which includes receiving a PPT request message from another device over a wireless communication link, transmitting at least a first PPT beacon signal during at least a first portion of a first assigned time slot, in response to the PPT request message, and selectively transmitting at least a second PPT beacon signal during at least a second portion of the first assigned time slot or at least a portion of a second assigned time slot.

In certain example implementations, a PPT request message may be associated with a peer-to-peer positioning operation, and/or the "another device" may include a base station, a target mobile station, a peer device, a network resource, and/or other like devices. A PPT request message may, for example, identify at least one of the first assigned time slot and/or the second assigned time slot.

In certain example implementations, selectively transmitting at least the second PPT beacon signal may include waiting for a period of time before transmitting the second PPT beacon signal. In one example, a period of time actually includes a substantially random period of time.

In certain example implementations, a first PPT beacon signal may be transmitted at a first transmission power level, and a second PPT beacon signal may be selectively transmitted at a second transmission power level that may be different than the first transmission power level.

In certain example implementations, a second PPT beacon signal may be transmitted if an acknowledgment message from the "another device", for example, ending a peer-to-peer positioning operation, has not been received.

In certain example implementations, a method may also include receiving location information from the "another device", wherein the location information may identify a location of a target mobile station as determined, at least in part, by a peer-to-peer positioning operation. Such location information may be encrypted.

By way of further example, in accordance with certain aspects, an apparatus may be provided which includes memory operatively enabled to store information received in a PPT request message from another device over a wireless communication link, and a processing unit coupled to the memory and operatively enabled to access the stored information and based, at least in part thereon, initiate transmission of at least a first PPT beacon signal during at least a first portion of a first assigned time slot, in response to the PPT request message, and selectively initiate transmission of at least a second PPT beacon signal during at least a second portion of the first assigned time slot or at least a portion of a second assigned time slot.

By way of further example, in accordance with certain aspects, an article of manufacture may be provided which includes a computer readable medium having computer implementable instructions stored thereon which if implemented by one or more processing units operatively enables the one or more processing units to access information associated with a PPT request message received from another device over a wireless communication link, and based, at least in part thereon initiate transmission of at least a first PPT beacon signal during at least a first portion of a first assigned time slot, and selectively initiate transmission of at least a second PPT beacon signal during at least a second portion of the first assigned time slot or at least a portion of a second assigned time slot.

DETAILED DESCRIPTION

Figure 1:
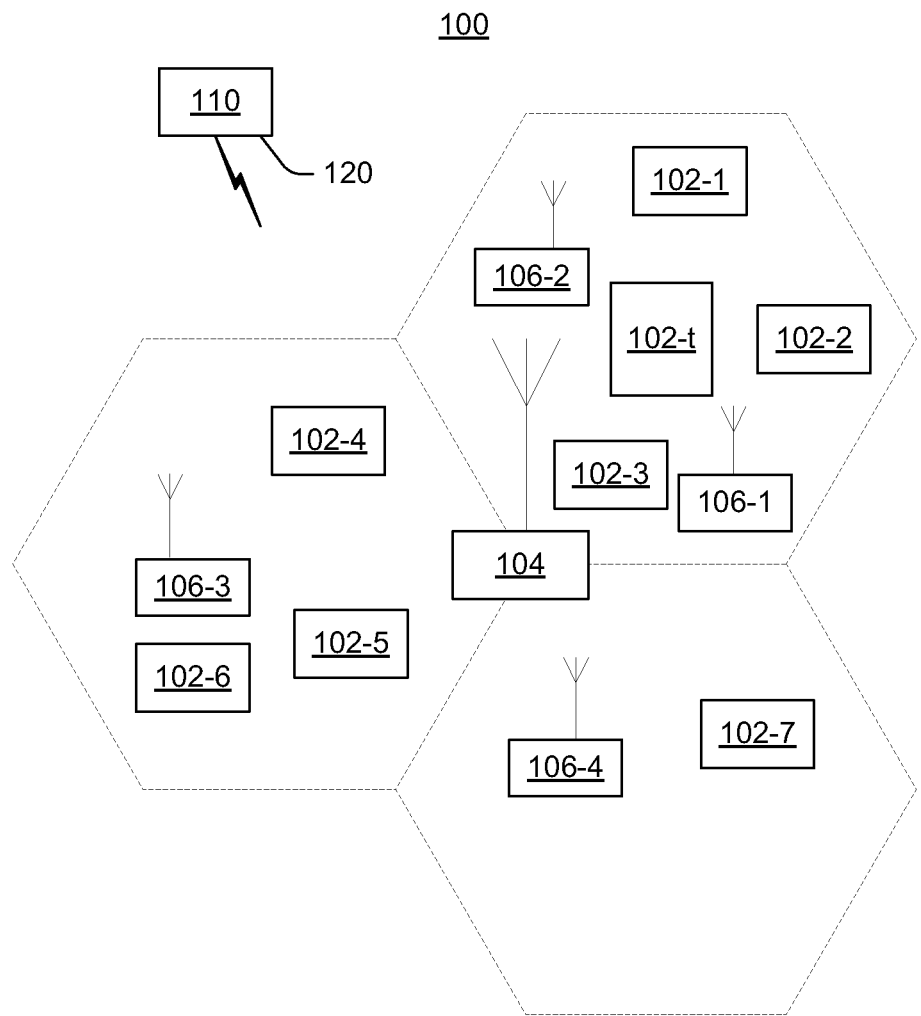
FIG. 1 is a block diagram illustrating an example wireless network that may be enabled to implement a peer-to-peer trilateration (PPT) scheme in accordance with an implementation.

Non-limiting and non-exhaustive aspects are described with reference to the following figures, wherein like reference numerals refer to like parts throughout the various figures unless otherwise specified.

When a mobile station (MS) is located inside a building and/or is otherwise located within an environment that in some manner limits the MS's ability to receive SPS signals, other techniques may need to be employed to help determine (e.g., estimate) the location of the MS. Some example techniques may, for example, include terrestrial network based solutions, such as Advanced Forward Link Trilateration (AFLT) or Observed Time Difference of Arrival (O-TDOA), which utilize the measurements from pilot channel transmitted by multiple base stations (BSs) to fix the location of an MS. However, such techniques may not always provide sufficient accuracy due, for example, to the (sometimes large) distance between a BS and MS which may lead to multipath errors in the resulting range measurements.

The methods and apparatuses described herein may be implemented as part of a peer-to-peer trilateration scheme that is referred to herein as a "PPT" scheme that may provide location information for MSs that are not able to perform SPS position fix and/or possibly improve position accuracy for a target MS due, for example, to possibly shorter distances between the target MS and participating peer devices.

As will be described in greater detail below, a PPT scheme may be considered as a positioning technique that uses reverse link signals transmitted and received by MSs. In many cases, a target MS may be unable to obtain a fix of its own location using SPS signals (e.g., using A-GPS) if the MS is inside a building or within an environment where SPS signals may be severely blocked, attenuated, and/or otherwise affected in some manner. A PPT scheme may, for example, be employed to allow a target MS that may be inside a building or such an environment to transmit at least one "beacon" signal (e.g., a reverse link signal, access probe signal, and/or the like) such that peer devices (e.g., other MSs) that may be located nearby and possibly outside the building/environment may detect. These peer devices may, for example, measure a time of arrival (TOA) for the beacon signal. When three or more TOAs are obtained from three or more peer devices, for example, it may be possible to determine the location of the target MS. In certain example implementations, one or more of the peer devices may be equipped with SPS functions that may synchronize an internal clock with respect to the SPS signals and/or SPS time.

Certain example implementations of a PPT scheme may also or alternatively be enabled to operate such that the peer devices transmit similar or other like beacon signals and the target MS measures corresponding TOAs. In both cases, a clock error in the target MS may lead to a TOA error in all or some of the TOA measurements, however, such TOA error may be accounted for (e.g., cancelled out) by certain positioning techniques, for example, as provided herein.

In accordance with certain further aspects described in greater detail below, a PPT scheme may be enabled to discover, alert, and/or otherwise determine which peer devices may be geographically nearby a target MS and possibly available to support certain PPT operations.

Position determination techniques described herein may be used for various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

A MS (and/or a BS, etc.) may also receive signals from satellites or the like, which may be from a Global Positioning System (GPS), Galileo, GLONASS, NAVSTAR, GNSS, a system that uses satellites from a combination of these systems, or any SPS developed in the future, each referred to generally herein as a Satellite Positioning System (SPS).

Furthermore, the methods and apparatuses described herein may be used with positioning determination systems that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile device which may be capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station".

The methodologies described herein may be implemented by various means depending upon the application. For example, these methodologies may be implemented in hardware, firmware, software, or a combination thereof. For a hardware implementation, one or more processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory of a MS, and executed by a processing unit of the MS. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in software, the functions that implement the methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, may include compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform.

Wireless communication networks are widely deployed to provide various communication services such as voice, data, messaging, and/or the like. These networks may be capable of supporting multiple users by sharing various network resources. Examples of such multiple-access networks include CDMA networks, TDMA networks, and FDMA networks.

Because of the E911 mandate and the increased attention of Location Based Services (LBSs), quite a few mobile location technologies have been introduced to the market. One of the popular technologies is A-GPS which uses the GPS to fix the location of a MS. With A-GPS, the BS may provide the MS with assistant information so that the MS is able to acquire SPS signals (here, e.g., GPS signals) from the satellites quicker than conventional GPS devices. Other technologies, such AFLT and O-TDOA may utilize the measurements from pilot channel transmitted by multiple BSs to fix the location of MS. As introduced above, a PPT scheme may use peer devices (e.g., MSs, etc.) for range measurements and position fix. In the sections below, some example transaction flows are presented to illustrate certain aspects and features that may be enabled as part of a PPT scheme with regard to a target MS, a plurality of peer devices, and at least one BS.

Some example collaborations among BS, target MS, and peer devices (e.g., nomadic and/or dedicated MSs and/or other devices) will now be presented in accordance with certain PPT schemes. Some considerations in such a PPT scheme may include determining when to wake up a nomadic peer device, when a target MS should transmit a beacon, when the peer devices (both nomadic and dedicated) should report their measurements, and when the nomadic devices should switch back from a PPT mode to another (e.g., normal) operation mode. These and other considerations are addressed below. In the examples presented herein reference is often made to actions that may be taken by a BS. It should be recognized, however, that such actions may actually be performed in whole or part by one or more other entity(s) within the network which may or may not be part of a BS in certain example implementations.

Additional considerations in such a PPT scheme may include how to identify peer devices that may be used to support the PPT scheme. This consideration and others will be addressed in still subsequent sections below.

Reference is now made to FIG. 1, which is a block diagram illustrating an example wireless network 100 that may be enabled to implement a PPT scheme in accordance with an implementation.

Wireless network 100 in this example includes a plurality of MSs 102-1, 102-2, 102-3, 102-4, 102-5, 102-6, 102-7, ..., 102-t. Here, MS 102-t may represent a target MS whose location is to be determined (e.g., estimated). MSs 102-1, 102-2, 102-3, 102-4, 102-5, 102-6, and 102-7 may represent a plurality of nomadic peer devices. Devices 106-1, 106-2, 106-3, and 1-6-4 may represent a plurality of dedicated peer devices.

These various devices may be arranged within a coverage area all or part of which may be serviced by BS 104, and which may be enabled to coordinate the measurements between target MS 102-t and the applicable peer devices. Here, for example, an applicable peer device (nomadic or dedicated) may be enabled to estimate or otherwise determine a range between itself and target MS 102-t and send such measurements/information back to BS 104. BS 104 may, for example, be enabled to collect various measurements/information. BS 104 may be enabled to calculate the position of target MS 102-t, and/or send received measurements to another network resource (e.g., another BS, network server, position determination entity (PDE), and/or or the like) for calculating the position of target MS 102-t.

As illustrated by dashed-line cell boundaries in FIG. 1, a plurality of cells and/or sectors may be operatively established and/or otherwise enabled.

Also shown in the example implementation in FIG. 1 is SPS 110, which may transmit SPS signals to various other devices within network 100.

Figure 2:
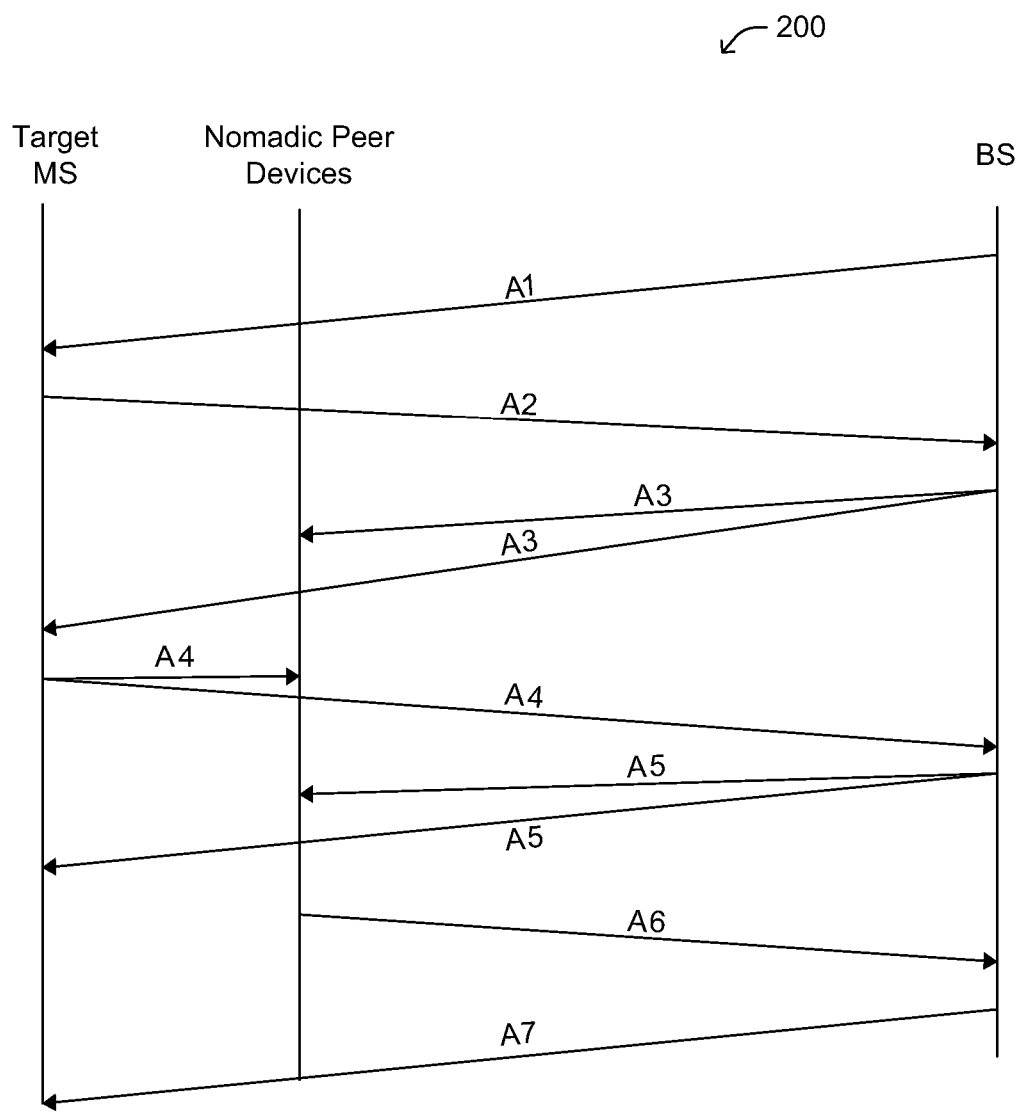
FIG. 2 shows an example information or message flow between devices in a wireless network, for example, as in FIG. 1, as part of a PPT scheme in accordance with an implementation.

FIG. 2 shows an embodiment of an example information or message flow 200 between a target MS, nomadic peer devices, and BS for a PPT scheme. Nomadic devices may, for example, include MSs with SPS (e.g., A-GPS, GPS, etc.) and reverse link (RL) functionalities. For this example, the BS, may send out a request message A1 to the target MS initiating a location fix for the target MS. If the target MS fails to have SPS functionality or is otherwise unable to provide a position fix based on SPS signals, the target MS may then send out a request message A2 to the BS requesting a PPT operation. The message A1 sent by the BS may be optional if the target MS itself initiates a positioning request. Thus, in certain implementations the target MS may omit an SPS position fix and send out a request message A2 directly to BS.

Having received a request message A2 from the target MS, the BS may send out a message A3 to request or otherwise inform the nomadic peer devices that are close to the target MS to participate in the PPT operation. Message A3 may include, for example, a wake up command, and may specify a process ID, one or more time slots for these peer devices to try to receive the target MS's transmitted beacon, a long code mask for detecting the target MS's beacon, and/or other configuration information that may be useful for the target MS and/or peer devices. In response to receiving a wake up command, a peer device may initiate and/or otherwise operatively enable/access SPS functionality (e.g., an onboard A-GPS, GPS engine, etc.). Peer devices that successfully fix their current positions may try to receive a RL for the beacon transmitted by the target MS. Peer devices that have not successfully fixed their current position using SPS signals and/or are unable to support the requested PPT operation for other reasons, may, for example, switch back to their previous operation mode.

The peer devices that are able to support the requested PPT and have successfully fixed their locations may, for example, adequately synchronize local device time to the SPS time, which may be obtained or otherwise determined from the SPS signals. Such time synchronization among the peer devices may, for example, allow a PPT scheme to be implemented in asynchronous networks such as a Universal Mobile Telecommunication System (UMTS) network that implements W-CDMA (UMTS).

Message A3 from the BS may also be received by the target MS. When the time slot specified by the message A3 is reached, the target MS may begin transmitting one or more beacons A4. Such beacons transmission may be timed to end, and/or may be ended if an acknowledgment message (ACK) A5 is received, for example, from the BS. For example, in cdma2000 network a beacon may include an access probe on a Reverse Access Channel (R-ACH) or a Reverse Enhanced Access Channel (R-EACH). Within the beacon, the target MS may, for example, provide transmit power information, a process ID, and/or other like information, which may enable receiving peer devices to establish path loss measurements, distinguish the beacon sender, etc.

A peer device may be enabled to receive and detect the RL beacon A4 transmitted by the target MS and to estimate a pseudorange or other like information associated with the distance from itself to the target MS. In addition to a pseudorange measurement or other like information, a peer device may, for example, be enabled to measure a received signal power and/or calculate a path loss. Once a peer device detects a beacon sent by a target MS, the peer device may report certain information to the BS, for example, via message A6. In message A6, for example, a peer device may report its own location, pseudo range, path loss measurements, and/or the like. The BS may use all or portions of the information received from various peer devices via messages A6 to fix the location of the target MS.

A peer device may, for example, be enabled to receive the ACK message A5 sent out by the BS. Once a peer device detects an ACK from the BS, the peer device may stop supporting the PPT operation and may switch to another operation mode.

As shown in FIG. 2, the BS may transmit an end of process message A7 to the target MS (and possibly one or more peer devices). The end of process message A7 may inform receiving devices that PPT operation has been ended (e.g., finished). The target MS's location information may also be included in end of process message A7. In certain implementations, such target MS's location information may be embedded in end of process message A7, for example, using data encryption techniques to provide additional security for the user of the target MS.

Figure 3:
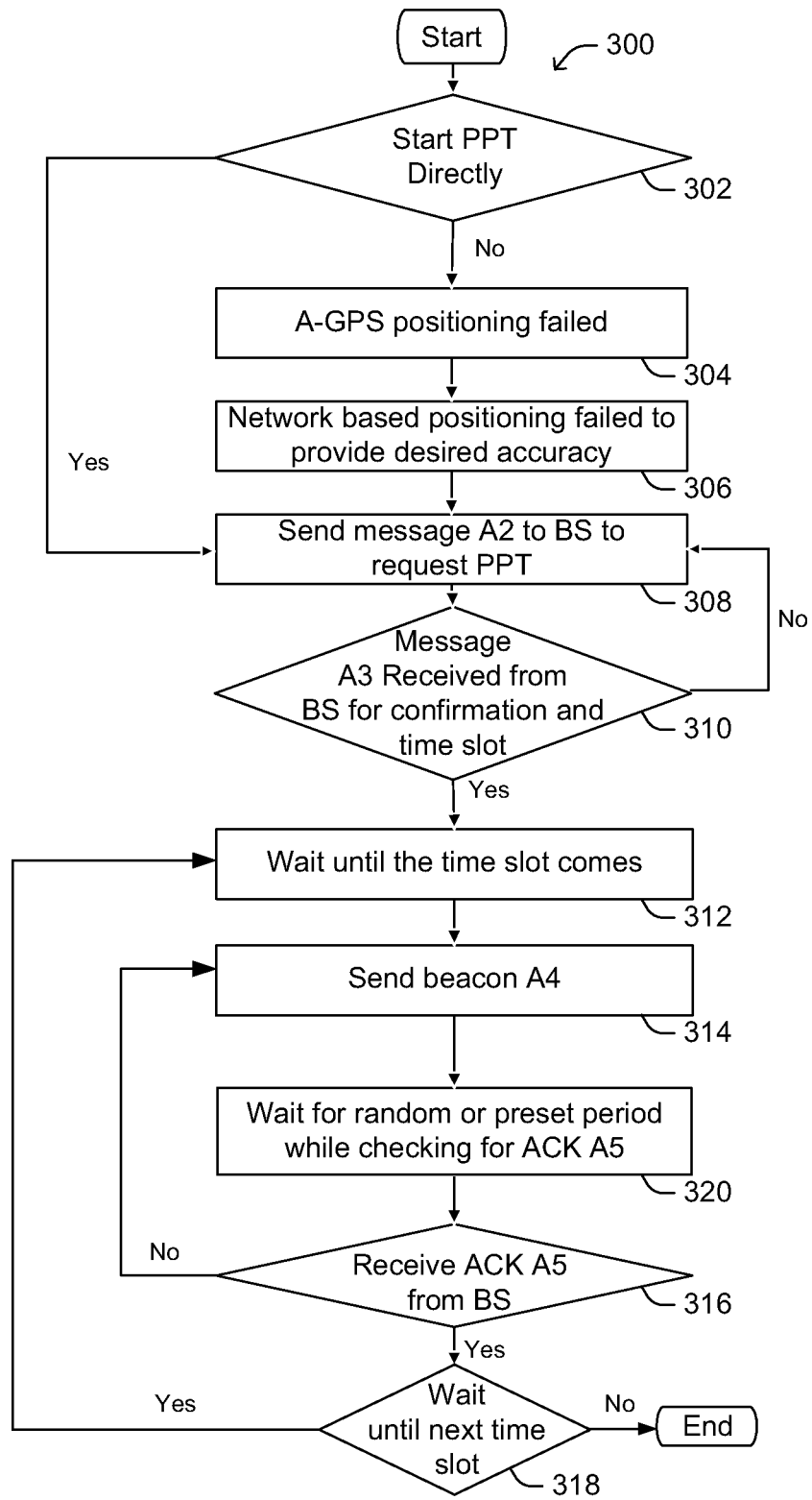
FIG. 3 shows an example flow-diagram of a method that may be implemented in a target mobile station, for example, to perform or otherwise support a PPT scheme in accordance with an implementation.

FIG. 3 shows an example flow-diagram of a method 300 that may be implemented in target MS 102-t (FIG. 1), for example, to perform or otherwise support a PPT scheme in accordance with message flow 200 (FIG. 2).

At block 302, it may be determined if a location fix is desired. Here, for example, a location fix (or a PPT operation) may be requested through a message A1 or a location fix may result from local initiation within the target MS. At block 302 the target MS may choose to start directly with a PPT mode (jumping to block 308) or to first try an SPS mode and/or other like network-based positioning solutions, such as AFLT for cdma2000.

At block 304, in this example, an SPS mode may be attempted and if it fails or is deemed inadequate (e.g., does not meet a desired accuracy, for example, as may be determined by QOS) then method 300 may move to block 306 wherein a network-based positioning solution(s) may be attempted. If the network-based positioning solution(s) fails or is deemed inadequate (e.g., does not meet a desired accuracy, for example, as determined by QOS), then method 300 may move to block 308. At block 308, the target MS may send a request message A2 to the BS to request the PPT operation. Block 308 may also be reached from block 302 if PPT is to start directly.

At block 310 it may be determined if a message A3 has been received from the BS confirming the requested PPT operation. At block 310, if a message A3 has not been received then method 300 may return to block 308. At block 310, if a message A3 has been received then method 300 may continue at block 312.

Message A3 may, for example assign one or more time slots during which the target MS may transmit beacon A4. At block 312, the target MS waits until an assigned time slot occurs. At block 314, the target MS may transmit beacon A4, for example, during all or part of the assigned time slot. In certain example implementations beacon A4 may include and/or be similar to an access probe or the like, e.g., in cdma2000.

At block 320, the target MS may wait for a period of time (e.g., a preset or random period of time, or a null or otherwise nominal period of time) while checking for an ACK A5 message.

At block 316, it may be determined if the target MS has received an ACK A5 message from the base station (or perhaps from other devices). If an ACK A5 message has not been received, then method 300 may return to block 314 to transmit another beacon, perhaps with increased transmission power during the same time slot, or may return to block 312 to transmit another beacon in one or more subsequent assigned time slot(s). If an ACK A5 message has been received, then at block 318, the target MS may determine whether to wait until a next time slot. If 'Yes' at block 318, then method 300 may return to block 312, otherwise, if 'No' then method may end.

Figure 4:
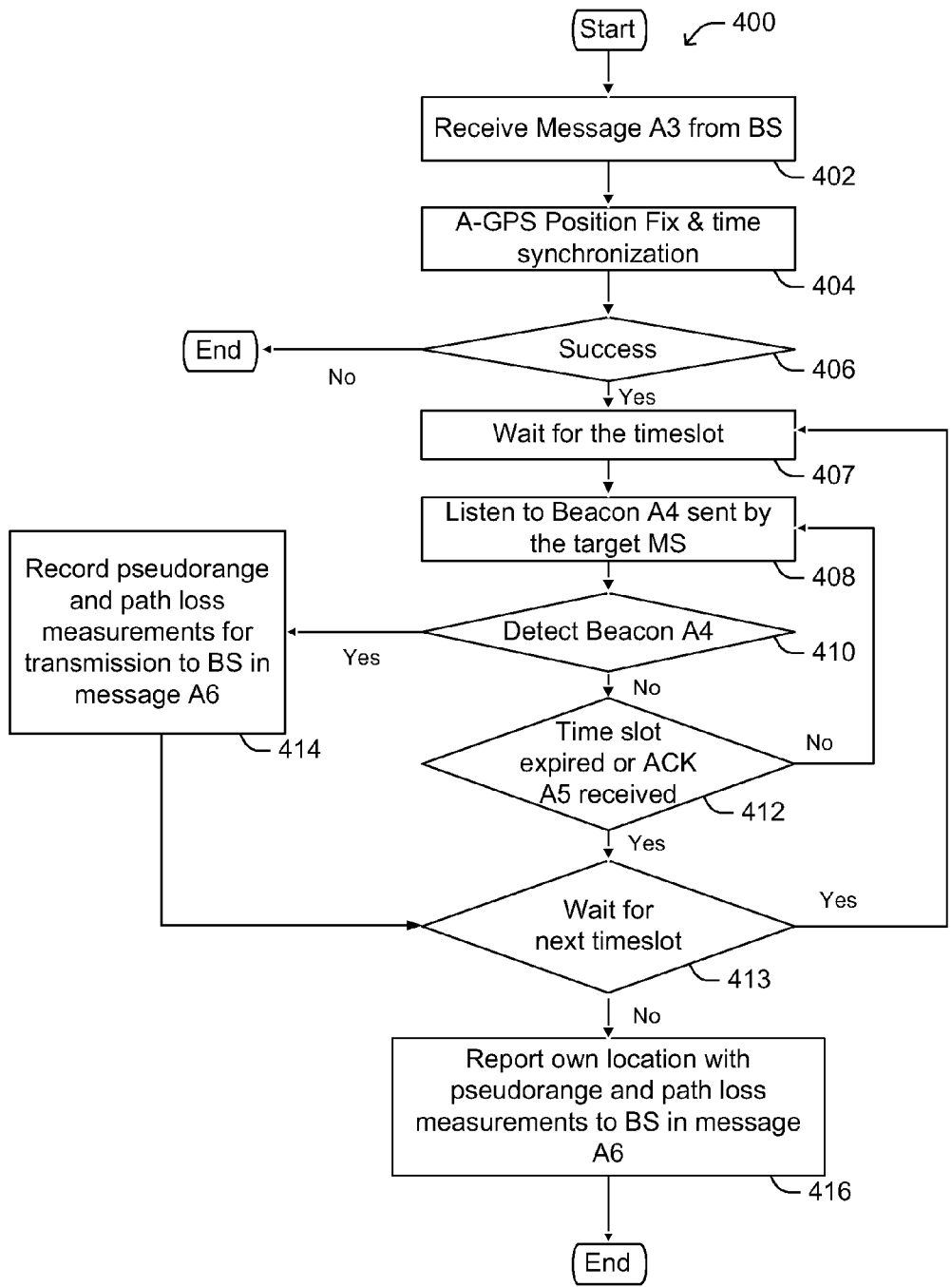
FIG. 4 shows an example flow-diagram of a method that may be implemented in a nomadic peer device, for example, to perform or otherwise support a PPT scheme in accordance with an implementation.

FIG. 4 shows an example flow-diagram of a method 400 that may be implemented in a nomadic peer device, such as, MS 102-1 (FIG. 1), for example, to perform or otherwise support a PPT scheme in accordance with message flow 200 (FIG. 2).

At block 402 a wake up command or like A3 message may be received. At block 404, the nomadic peer device may initiate or otherwise access an SPS (e.g., A-GPS, GPS, etc.) engine or other like functionality (or available information) to try to fix its own location and possibly synchronize (as may be needed) to SPS time. At block 406 it may be determined if the peer device has been successful in fixing its own location (and, as applicable synchronizing to SPS time). If the peer device has not been successful in fixing its own location (and, as applicable synchronizing to SPS time), then method 400 may end. If the peer device has been successful in fixing its own location (and, as applicable synchronizing to SPS time), then method 400 may continue at block 407. At block 407, method 400 may include waiting for a timeslot in case the BS has configured the target mobile to transmit diversity beacons.

At block 408, the peer device may attempt to receive ("listen" to) a RL beacon A4 transmitted by the target MS. Here, for example, a peer device may wait for an assigned time slot to occur, during which such beacon A4 is expected to be transmitted. At block 410 it may be determined if a beacon A4 has been received. If a beacon A4 has been received, then at block 414 the peer device may transmit (report, record, etc.) its own location, and measured pseudorange, path loss, and/or the like to the BS (e.g., via a message A6), at which point method 400 may continue at block 413. If a beacon A4 has not been received, then method 400 may continue at block 412 wherein it may be determined if an assigned time slot has expired and/or if an ACK A5 message has been received (e.g., over a forward link (FL)). If an assigned time slot for the PPT operation has expired and/or an ACK A5 message received, then method 400 may continue at block 413. If an assigned time slot for the PPT operation has not expired and no ACK A5 message received, then method 400 may continue at block 408.

At block 413, method 400 may decide to wait for the next timeslot. If "Yes" at block 413, then method 400 may return at block 407. If "No" at block 413, then method 400 may continue at block 416. At block 416, the peer device may report its own location with pseudorange and path loss measurements to BS in message A6. Method 400 may end after block 416.

In certain implementations, it may be beneficial and/or convenient to use one or more dedicated peer devices 106 (FIG. 1) to support a PPT operation. A dedicated peer device may, for example, be deployed at certain locations and dedicated for range and path loss measurements. These dedicated peer devices may also have the SPS functionality and synchronize themselves to the SPS time (as the need may be). These dedicated devices, furthermore, may either continually monitor the RL for beacons or monitor the RL on preconfigured intervals as set and optimized by the network. It should be recognized that in certain implementations the coordination between a dedicated peer device and the BS may be less than that of nomadic peer devices, as messages A3 and/or A5 from BS (FIG. 2) may not be needed for dedicated peer devices.

In another embodiment, the nomadic peer devices may have been "preconfigured", as they entered the current cell served by BS 104 (FIG. 1), to monitor the RL for beacons at regular intervals and preset time slot durations as set and optimized by the network. It should be recognized that in this example the coordination between the nomadic peer devices and the BS may not use messages A3 and/or A5 from BS (FIG. 2.)

Figure 5:
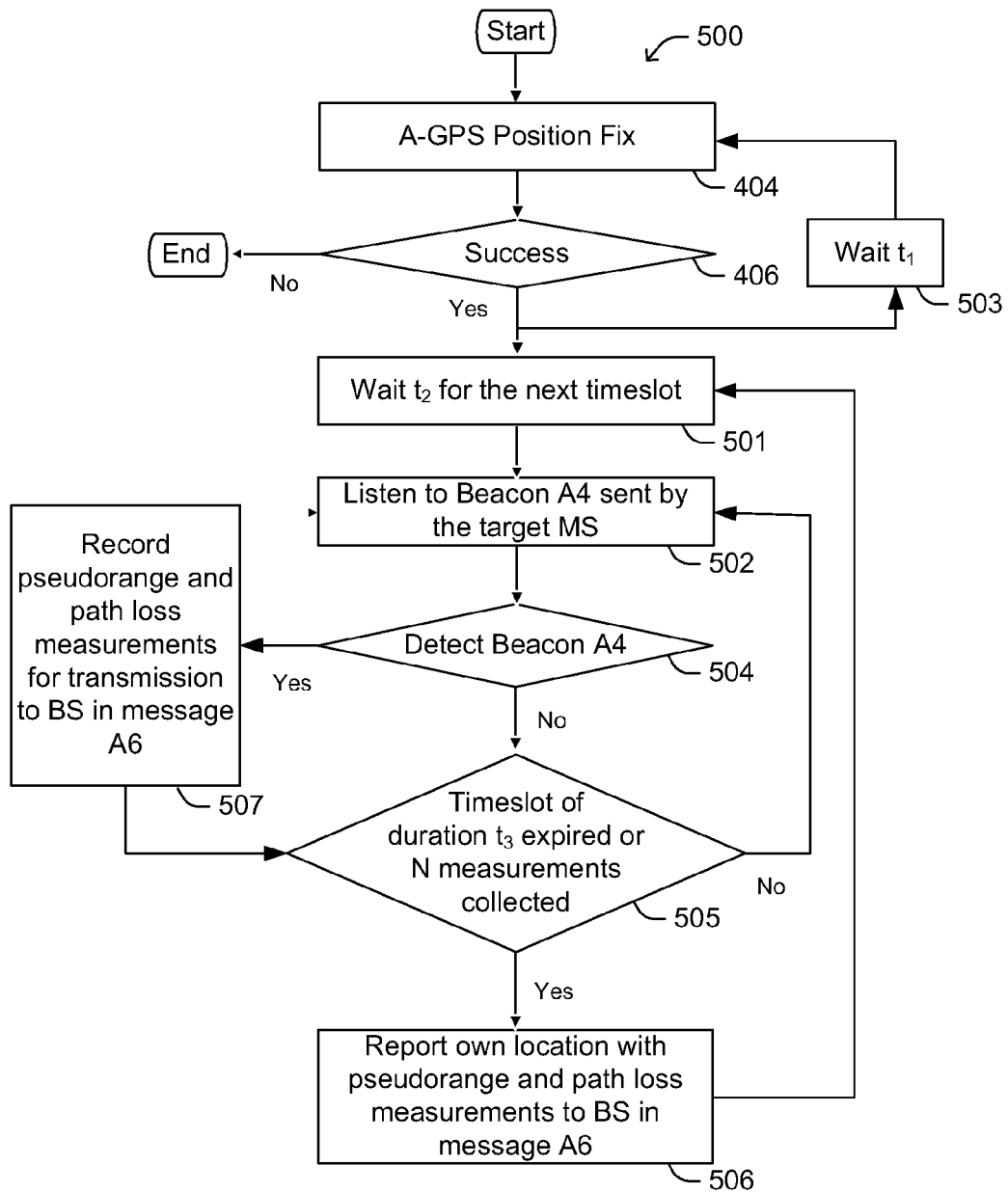
FIG. 5 shows an example flow-diagram of a method that may be implemented in a dedicated peer device, for example, to perform or otherwise support a PPT scheme in accordance with an implementation.

With this in mind, FIG. 5 shows an example flow-diagram of a method 500 that may be implemented in a dedicated peer device or "preconfigured" nomadic peer device, such as, device 106-1 (FIG. 1), for example, to perform or otherwise support a PPT scheme in accordance with message flow 200

(FIG. 2). As illustrated in FIG. 5, blocks 404 and 406 may be included in certain implementations as part of method 500.

Method 500 may, for example, be implemented for devices enabled to support a preconfigured timeslot operation. Thus, in this example method 500, wait times $t_1$ & $t_2$, and a timeslot duration of $t_3$ have been included. In certain implementations, $t_1$ may be zero (e.g., to correspond to continuous GPS tracking), $t_2$ may be zero, and/or $t_3$ may be infinite (e.g., to correspond to always monitoring for A4 beacons). In still other example implementations, $t_1$ may be equal or about equal to the sum of $t_2$ and $t_3$.

Thus, as illustrated in FIG. 5, at block 503 a wait time $t_1$ may be introduced between block 406 and 404. At block 501, a wait time $t_2$ may be introduced between block 406 and 502.

At block 502 in this example, a dedicated or "preconfigured" nomadic peer device may be enabled to receive a transmitted beacon A4 as may be transmitted by the target MS on the RL. At block 504 it may be determined if a beacon A4 has been received. If a beacon A4 has not been received, then method 500 may continue at block 505. If a beacon A4 has been received, then method 500 may continue at block 507. At block 507, the peer device may record pseudorange and path loss measurements for transmission to BS in message A6, and method 500 may continue at block 505.

At block 505, it may be determined if a timeslot duration of $t_3$ has expired or if N measurements have been collected. N may equal 1 or more. Here, for example, parameter N may be implemented to reflect the number of measurements that may be collected by the peer device (fixed or nomadic) and reported in a transmission to the BS. Such parameter N may, for example, be implanted in a manner to operatively control the number of messages that a peer device may need to transmit to a BS. If "No" at block 505, then method 500 may return at block 502. If "Yes" at block 505, then method 500 may continue at block 506.

At block 506, wherein the dedicated or "preconfigured" nomadic peer device may report (e.g., via report message A6) its own location (if needed), measured pseudo range, path loss measurements, and/or the like to the BS, along with a process ID and/or the like to identify the beacon A4 that was received.

It is worth noting that in message A6, the location information of the dedicated devices may be optional. For example, the location information of the dedicated devices may be reported either once as powered on, and/or every T seconds (where, for example, T is a system optimization parameter).

Figure 6:
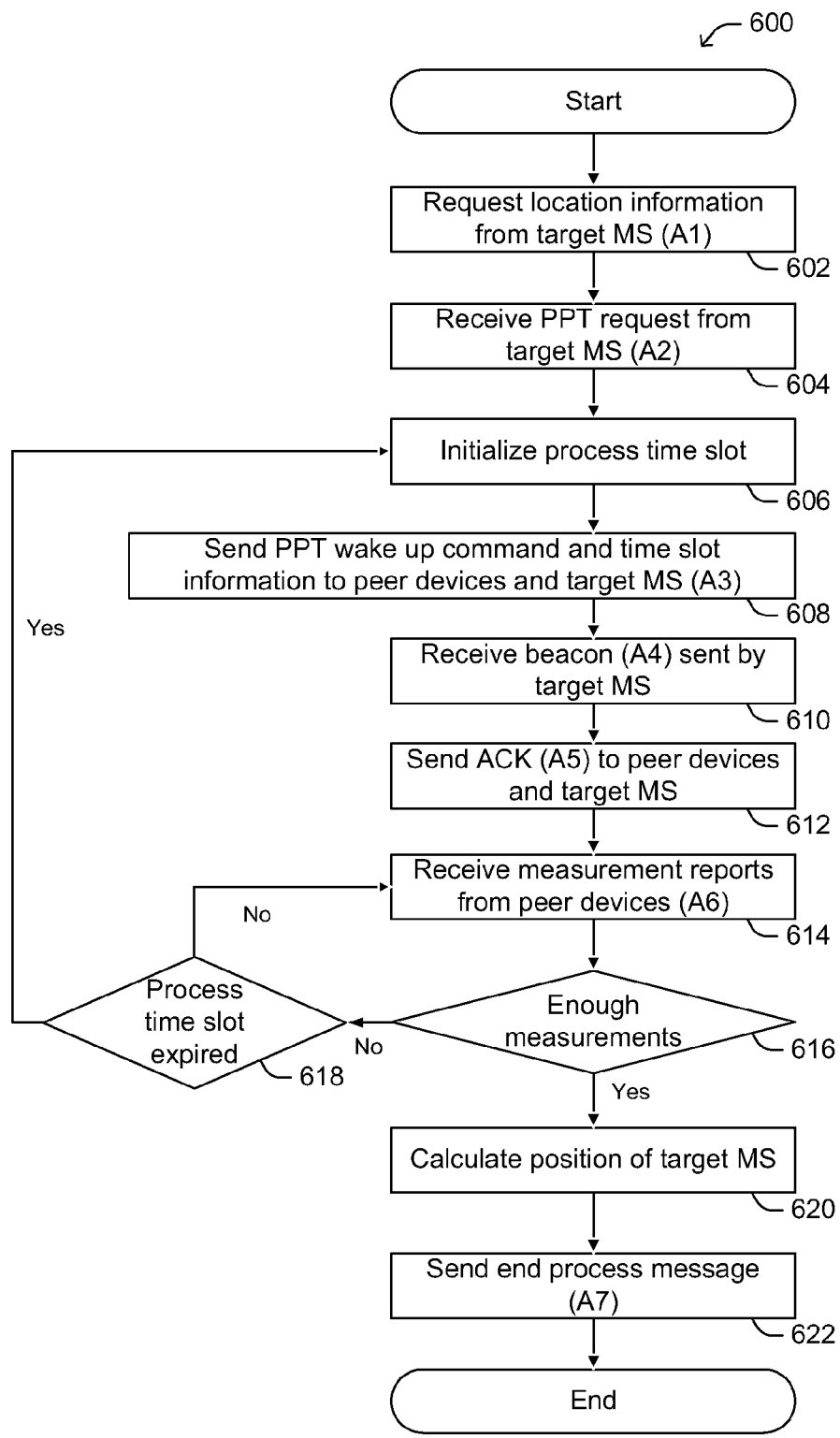
FIG. 6 shows an example flow-diagram of a method that may be implemented in a base station, for example, to perform or otherwise support a PPT scheme in accordance with an implementation.

FIG. 6 shows an example flow-diagram of a method 600 that may be implemented in a base station, such as, BS 104 (FIG. 1), for example, to perform or otherwise support a PPT scheme in accordance with message flow 200 (FIG. 2).

At block 602, the BS may transmit a position request message A1 to a target MS. Here, for example, the BS may transmit a position request message A1 in response to a request for location information for the target MS from one or more other network resources. At block 604, the BS may receive a PPT operation request A2 from the target MS. At block 606, the BS may assign one or more process time slots to the PPT operation.

At block 608, the BS may transmit a message A3, which may, for example, include a PPT wake up command for a plurality of nomadic peer devices, specify one or more time slots for target MS and peer devices, specify a long code mask for detecting a target MS's beacon, specify a process ID, and/or specify other configurations/information as may be useful for the PPT operation.

At block 610, the BS may receive a beacon A4 transmitted by the target MS. At block 612, the BS may transmit an ACK message A5. At block 614, the BS may receive information reported, as may be transmitted via messages A6, from the various peer devices that supported the PPT operation.

At block 616, it may be determined if the BS has received enough information from the peer devices to allow calculating the location of the target MS. If enough information has not been received from the peer devices, then method 600 may continue at block 618 wherein the BS may determine whether the assigned time slot(s) have expired. If the assigned time slot(s) have not expired, then method 600 may continue at block 614. If the assigned time slot(s) have expired, then method 600 may continue at block 606, for example. If at block 616 it is determined that enough information has been received from the peer devices, then method 600 may continue at block 620 wherein the location of the target MS may be calculated by a network entity (such as PDE, location server, and/or the like). Here, at this stage certain information available within the network, such as, e.g., previous A-GPS or AFLT measurements, may be combined and used as applicable in determining a final location calculation. At block 622, the BS may transmit and/or otherwise provide the calculated location information for the target MS to one or more other network resources, as may be applicable. At block 622, the BS may transmit calculated location information to the target MS, for example, embedded in a message A7 that may also serve to inform the target MS that the PPT operation has ended.

In the sections below, some example techniques are described which may be implemented as part of a PPT scheme to discover, alert, and/or otherwise determine which peer devices (e.g., nomadic and/or dedicated) may be geographically nearby a target MS and possibly available to support a PPT operation.

In accordance with certain aspects, a PPT scheme may be implemented to make a BS aware of which peer devices may be nearby a target MS and possibly available to support a PPT operation. For example, in certain implementations, a PDE and/or other like location server may be enabled to make the BS aware of devices that support a PPT operation. Here, for example, a BS may be enabled to try to target message A3 for peer devices near a target device based on a coarse location estimate for the target MS. Since the target MS may not have a SPS location fix, a coarse location estimate may be attempted using another location technology such as AFLT, a signal strength based positioning method, etc. If such other location technologies are unsuccessful or otherwise unavailable, then the BS may be enabled to determine which sectors or cells are associated with the target MS. Once a coarse location estimate has been established for a target MS, the network (e.g., a BS, location server, and/or other like devices) may determine which peer devices may be located in the vicinity of the target MS and/or otherwise available to possibly support a PPT operation. For example, the network may determine or otherwise access location estimates of peer devices nearby the coarse location estimate. This discovery process may include requesting location fixes for one or more peer devices, and/or accessing other network resources to determine locations and/or course location estimates for the peer devices.

The network may be enabled to select a plurality (N) of peer devices (N) that are located nearby the target MS. The number N may, for example, be a function of uncertainty of the location estimates of the target MS and/or peer devices. In certain example implementations, N should be at least three (N=3) if not greater. If the confidence level of location estimate of the target MS is deemed low or AFLT is not successful, then the coarse location estimate of the target MS may include an entire sector (or cell) area in which case N may be as large as the number of all outdoor MSs within the sector (or cell). In some cases if the target MS seems to be located at a sector (or cell) boundary, then N may be as large as the number of peer devices within the neighbor sectors (or cells). Thus, in many cases N may be much larger than three.

Figure 7:
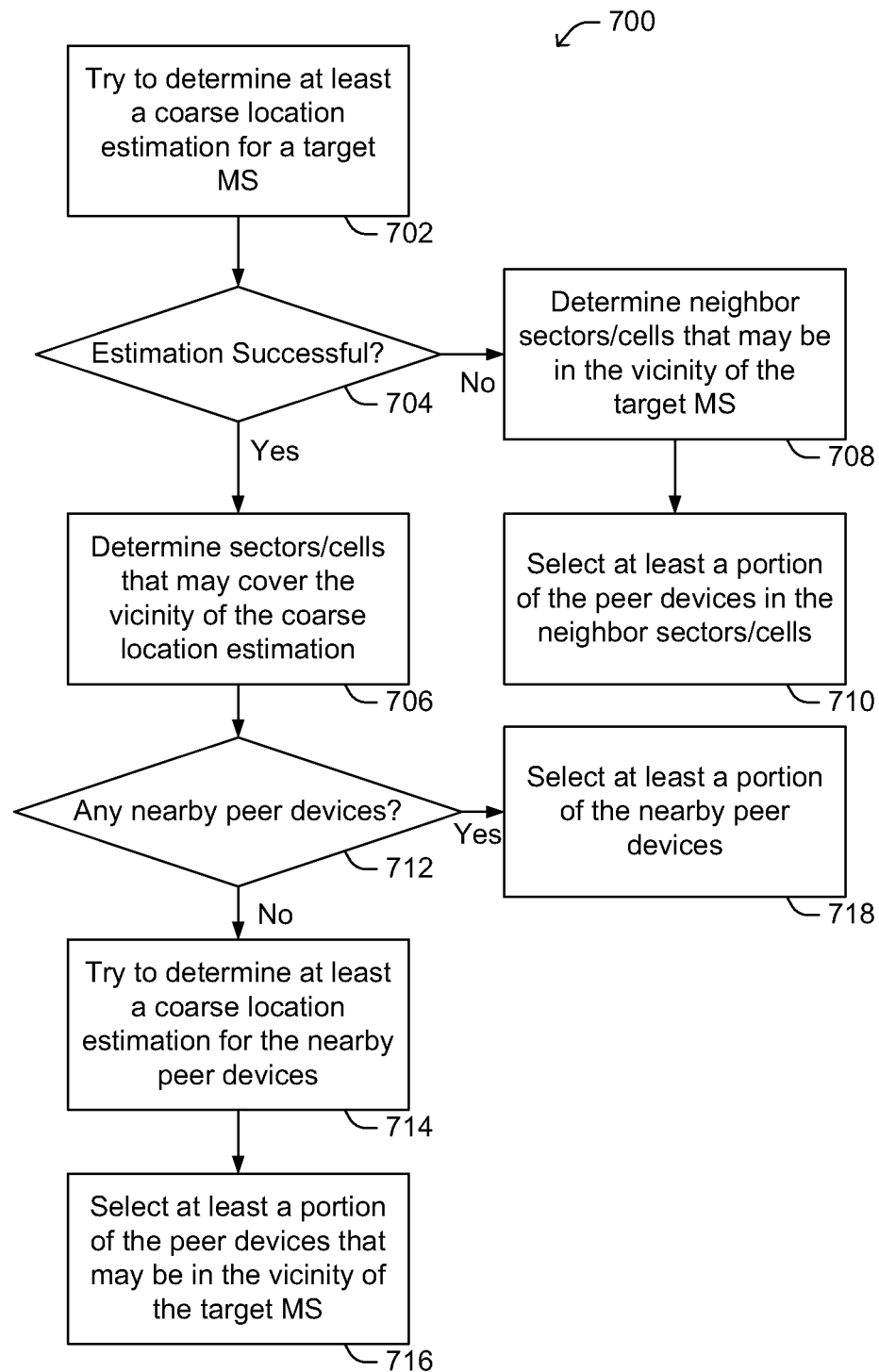
FIG. 7 shows an example flow-diagram of a method that may be implemented in a wireless network, for example, to perform or otherwise support a PPT scheme in accordance with an implementation.

FIG. 7 shows an example flow-diagram of a method 700 that may be implemented in wireless network 100 (FIG. 1), for example, to perform or otherwise support a PPT operation.

At block 702, a target MS may attempt to determine at least a coarse location estimate for itself, for example, based on AFLT and/or other network-based positioning solution(s). At block 704 it may be determined if such location estimates were successful. If such location estimates were successful, then method 700 may continue at block 706 wherein it may be determined which sectors (or cells) may cover the vicinity of the target MS based on its coarse location estimates. If at block 704 it is determined that such coarse location estimates were not successful, then method 700 may continue at block 708 wherein it may be determined which neighbor sectors (or cells) may be in the vicinity of the target MS. At block 710, at least a portion of the peer devices available in the neighbor sectors/cells may be selected to support the PPT operation.

At block 712, a determination may be made as to whether there may be any nearby peer devices in the sectors/cells determined at block 706. If there are enough nearby peer devices in the vicinity of the target MS in the sectors/cells determined at block 706, then at block 718 at least a portion of the peer devices available in such sectors/cells may be selected to support the PPT operation. If at block 712 there is not information available to determine any nearby peer devices and/or enough nearby peer devices in the vicinity of the target MS in the sectors/cells determined at block 706, then at block 714 an attempt may be made, which in one embodiment might be done autonomously by the peer devices themselves, to determine at least coarse location estimations for nearby peer devices in the sectors/cells determined at block 706. At block 716 at least a portion of these nearby peer devices that may be in the vicinity of the target MS may select or may be selected to support the PPT operation.

Thus, by way of example but not limitation, in certain example implementations, a network (e.g., combination of BS, PDE, location server, etc.) may be enabled to determine which sector/cell a target device is in, send a message to all or selected peer devices requesting a position fix, wherein, for example, such peer devices may perform a position fix and report back to the network. The network may receive such position fixes and determine which peer devices may be within the vicinity of the target device. The network may then send another message to such peer devices to participate in a PPT operation, In certain other example implementations, a peer discovery operation may be performed which enables one or more peer devices to decide whether to participate in a PPT operation. Here, for example, a network may be enabled to determine which sector/cell a target device is in and send a message (e.g., A3 in FIG. 2) to all or selected peer devices in the same sector/cell or close thereto alerting the peer devices of an upcoming PPT operation and informing them of the coarse location of the target device. These peer devices may then attempt to perform a position fix (if desired/needed) and/or otherwise determine whether they are in an adequately open sky environment, within the vicinity of the target device to participate in the PPT transaction, and/or take into account other operational factors. As such, in certain situations, it may be that only a subset of peer devices decides to participate in the PPT operation. Those peer devices that do decide to participate, may report their measurements back to the network (e.g., using message A6 in FIG. 2).

In still other example, implementations, the network may attempt to make a determination of the peer devices within the vicinity of the target device only if there is enough "relevant" information available. Such an implementation, for example, may work well in an LDC, inGeo™ system, and/or the like. Here, for example, the network may search through position reports available to it within the past 't' seconds, and if there are enough reports (e.g., N>3) of peer devices within the vicinity of the target device, the network may selectively send a message (e.g., A3 in FIG. 2) to those peer devices.

Figure 8:
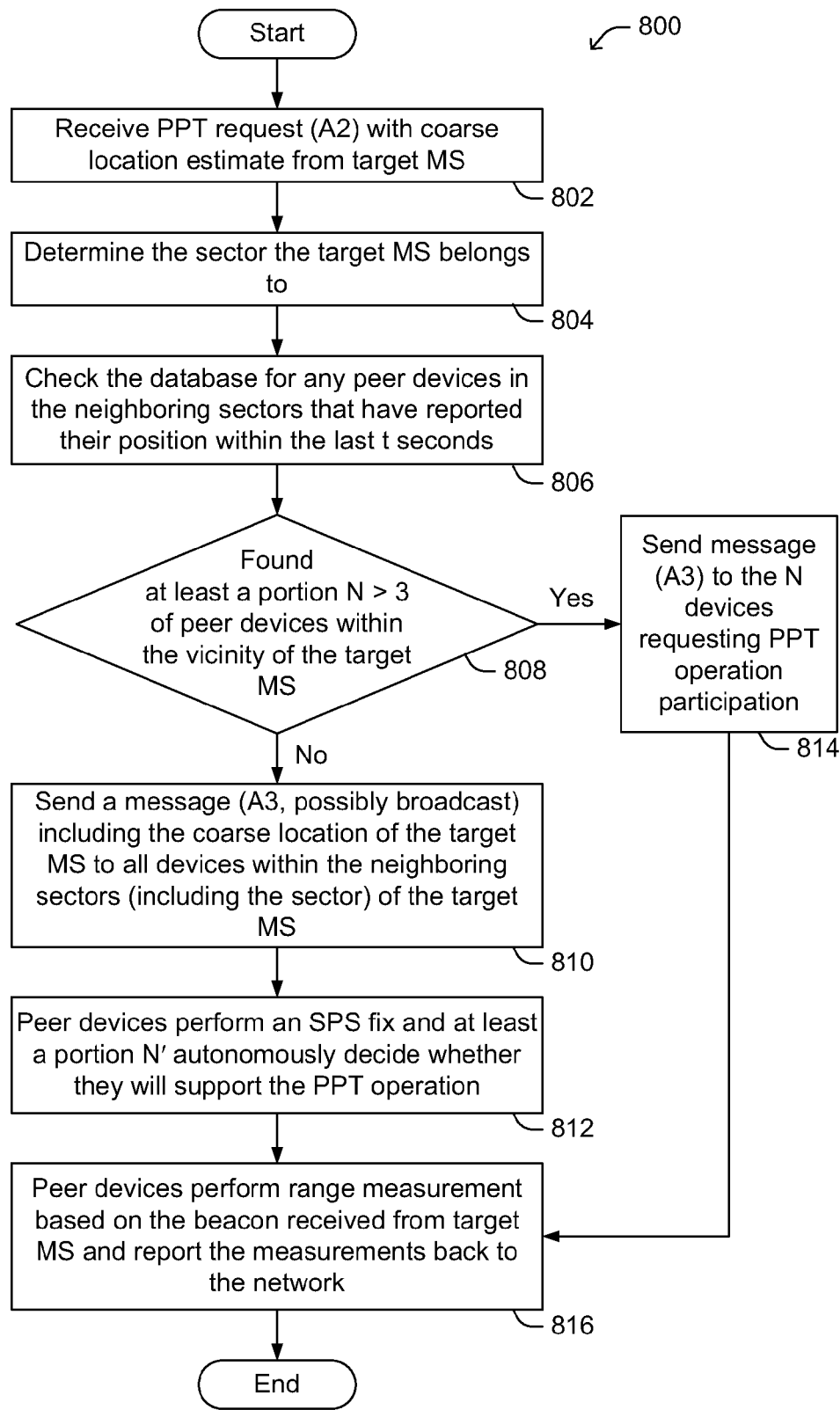
FIG. 8 shows an example flow-diagram of a another method that may be implemented in a wireless network, for example, to perform or otherwise support a PPT scheme in accordance with an implementation.

Thus, by way of further example, a method 800 is shown in FIG. 8. Here, at block 802 a PPT request (A2) may be received with a coarse location estimate from the target MS. At block 804, the sector/cell that the target MS belongs to (e.g., is currently operating within) may be determined. At block 806, a database or other like information repository may be accessed and checked to determine if any peer devices in the neighboring sectors/cells may have recently reported their position within the last 't' seconds. At decision block 808, it may be determined if at least a portion (e.g., N>3) of the peer devices are believed to be within the vicinity of the target device (MS). If the decision is NO, then method 800 may continue at block 810. If the decision is YES, then method 800 may continue at block 814.

At block 810, a message (A3) may be transmitted (in some implementations, broadcast), which may include the course location or the like of the target device to peer devices within the same sector/cell as the target and (as applicable) within applicable neighboring sectors/cells. At block 812, such peer devices may perform an SPS fix and at least a portion (e.g., N') may autonomously decide to support and hence participate in the PPT operation.

Back at block 814, a message (A3) may be sent to the N peer devices requesting that they participate in the PPT operation.

From either block 812 or 814, method 800 continues with block 816. At block 816, peer devices that are participating in the PPT operation may perform range measurements based on the beacon received from the target device (MS) and report the measurements back to the network.

Figure 9:
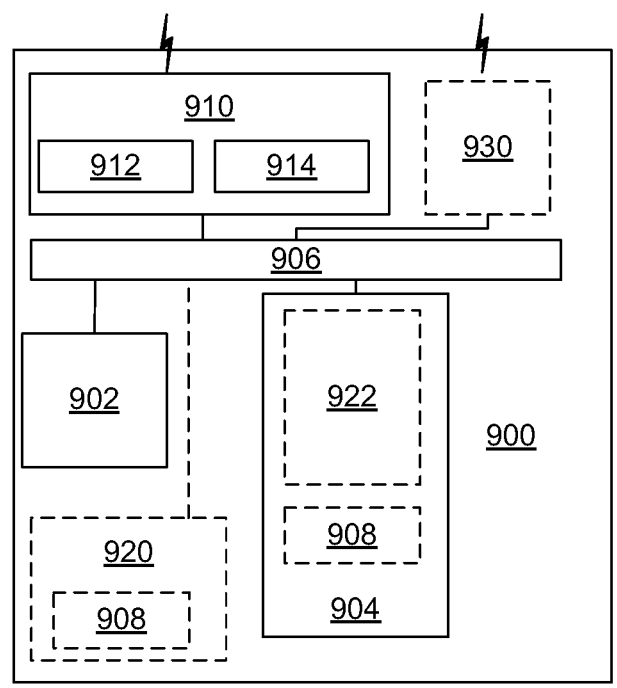
FIG. 9 is a block diagram illustrating an exemplary device that may, for example, be included in a wireless network and operatively enabled to perform or otherwise support at least a portion of a PPT operation in accordance with an implementation.

FIG. 9 is a block diagram illustrating an exemplary device 900 that may, for example, be included in wireless network 100 (FIG. 1) and operatively enabled to perform or otherwise support at least a portion of the example PPT operations described herein.

Device 900 may, for example, include one or more processing units 902, memory 904, communication interface 910, an (optional) SPS receiver 930, which may be operatively coupled with one or more connections 906 (e.g., buses, lines, fibers, links, etc.).

Processing unit 902 may be implemented in hardware, software, or a combination of hardware and software. Thus, for example, processing unit 902 may represent one or more circuits configurable to perform at least a portion of a data computing procedure or process. By way of example but not limitation, processing unit 902 may include one or more processors, controllers, microprocessors, microcontrollers, application specific integrated circuits, digital signal processors, programmable logic devices, field programmable gate arrays, and the like, or any combination thereof.

Memory 904 may represent any data storage mechanism. Memory 904 may include, for example, a primary memory and/or a secondary memory. Primary memory may include, for example, a random access memory, read only memory, etc. While illustrated in this example as being separate from processing unit 902, it should be understood that all or part of a primary memory may be provided within or otherwise co-located/coupled with processing unit 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, computer readable medium 920. As such, in certain example implementations, the methods and/or apparatuses presented herein may take the form in whole or part of a computer readable medium 920 that may include computer implementable instructions 908 stored thereon, which if executed by at least one processing unit 902 may be operatively enabled to perform all or portions of the example peer-to-peer trilateration operations (e.g., PPT operations) as described herein. Such computer implementable instructions 908 may also be provided by memory 904, as also illustrated in this example.

Memory 904 may also include data 922 that may be associated with one or more of the example peer-to-peer trilateration operations (e.g., PPT operations), messages, etc., as described herein.

Communication interface 910 may, for example, include one or more receivers 912 and a transmitter 914, and/or combination thereof. As shown, communication interface 910 may be operatively enabled to communicate over wireless links.

SPS receiver 930, which may be optional in certain implementations, may be enabled to receive SPS signals, establish a location fix based at least in part on the SPS signals, and in certain cases support synchronizing a local clock (not shown) to an SPS time.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for use in supporting peer-to-peer trilateration (PPT), the method comprising:
    with a first peer device:
        receiving a PPT request message broadcast from another device over a wireless communication link to at least said first peer device and at least a second peer device as part of a peer-to-peer positioning operation in which said first peer device participates by transmitting one or more PPT beacon signals to at least said second peer device, and wherein said PPT request message is indicative to at least said second peer device to participate in said peer-to-peer positioning operation by preparing to receive said at least one PPT beacon signal from said first peer device;
        in response to said PPT request message, transmitting at least a first PPT beacon signal to at least said second peer device during at least a first portion of a first assigned time slot; and
        in response to a determination that said peer-to-peer positioning operation has not ended, transmitting at least a second PPT beacon signal to at least said second peer device during at least a second portion of said first assigned time slot or at least a portion of a second assigned time slot, and wherein said first peer device comprises a target mobile station having a currently unknown location and said second peer device comprises a nomadic mobile station.

2. The method as recited in claim 1, wherein said another device comprises at least one of a base station, a dedicated peer device, and/or a network resource.

3. The method as recited in claim 1, wherein said PPT request message identifies at least one of said first assigned time slot and/or said second assigned time slot.

4. The method as recited in claim 1, wherein transmitting at least said second PPT beacon signal comprises waiting for a period of time before transmitting said second PPT beacon signal.

5. The method as recited in claim 4, wherein said period of time comprises a random period of time.

6. The method as recited in claim 1, wherein transmitting at least said first PPT beacon signal comprises transmitting said first PPT beacon signal at a first transmission power level, and transmitting at least said second PPT beacon signal comprises transmitting said second PPT beacon signal at a second transmission power level that is different than said first transmission power level.

7. The method as recited in claim 1, wherein transmitting at least said second PPT beacon signal comprises transmitting at least said second PPT beacon signal if an acknowledgment message from said another device ending said peer-to-peer positioning operation has not been received.

8. The method as recited in claim 1, further comprising:
    receiving location information from said another device, said location information identifying a location of said first peer device as determined, at least in part, by a peer-to-peer positioning operation.

9. The method as recited in claim 8, wherein said location information is received encrypted.

10. An apparatus for use in a first peer device enabled to support peer-to-peer trilateration (PPT), the apparatus comprising:
    means for receiving a PPT request message broadcast from another device over a wireless communication link to at least said first peer device and at least a second peer device as part of a peer-to-peer positioning operation in which said first peer device participates by transmitting one or more PPT beacon signals to at least said second peer device, and wherein said PPT request message is indicative to at least said second peer device to participate in said peer-to-peer positioning operation by preparing to receive said at least one PPT beacon signal from said first peer device;
    means for initiating transmission of at least a first PPT beacon signal to at least said second peer device during at least a first portion of a first assigned time slot, in response to said PPT request message; and
    means for initiating transmission of at least a second PPT beacon signal to at least said second peer device during at least a second portion of said first assigned time slot or at least a portion of a second assigned time slot, in response to a determination that said peer-to-peer positioning operation has not ended, and wherein said first peer device comprises a target mobile station having a currently unknown location and said second peer device comprises a nomadic mobile station.

11. The apparatus as recited in claim 10, wherein said another device comprises at least one of a base station, a dedicated peer device, or a network resource.

12. The apparatus as recited in claim 10, wherein said PPT request message identifies at least one of said first assigned time slot and/or said second assigned time slot.

13. The apparatus as recited in claim 10, further comprising:
means for waiting for a period of time before transmitting said second PPT beacon signal.

14. The apparatus as recited in claim 13, wherein said period of time comprises a random period of time.

15. The apparatus as recited in claim 10, wherein:
said means for initiating transmission of at least said first PPT beacon signal further comprises means for initiating transmission of said first PPT beacon signal at a first transmission power level; and
said means for initiating transmission of at least said second PPT beacon signal comprises means for initiating transmission of said second PPT beacon signal at a second transmission power level that is different than said first transmission power level.

16. The apparatus as recited in claim 10, wherein said means for initiating transmission of at least said second PPT beacon signal comprises means for initiating transmission of at least said second PPT beacon signal if an acknowledgment message from said another device ending said peer-to-peer positioning operation has not been received.

17. The apparatus as recited in claim 10, further comprising:
means for receiving location information from said another device, said location information identifying a location of said first peer device as determined, at least in part, by a peer-to-peer positioning operation.

18. The apparatus as recited in claim 17, wherein said location information is received encrypted.

19. A first peer device comprising:
a communication interface to receive a peer-to-peer trilateration (PPT) request message broadcast from another device over a wireless communication link to at least said first peer device and at least a second peer device as part of a peer-to-peer positioning operation in which said first peer device participates by transmitting one or more PPT beacon signals to at least said second peer device, and wherein said PPT request message is indicative to at least said second peer device to participate in said peer-to-peer positioning operation by preparing to receive said at least one PPT beacon signal from said first peer device; and
a processing unit coupled to said communication interface to:
initiate transmission of at least a first PPT beacon signal to at least said second peer device during at least a first portion of a first assigned time slot, in response to said PPT request message, and
in response to a determination that said peer-to-peer positioning operation has not ended, initiate transmission of at least a second PPT beacon signal to said second peer device during at least a second portion of said first assigned time slot or at least a portion of a second assigned time slot, and wherein said first peer device comprises a target mobile station having a currently unknown location and said second peer device comprises a nomadic mobile station.

20. The first peer device as recited in claim 19, wherein said another device comprises at least one of a base station, a dedicated peer device, or a network resource.

21. The first peer device as recited in claim 19, wherein said PPT request message identifies at least one of said first assigned time slot and/or said second assigned time slot.

22. The first peer device as recited in claim 19, said processing unit to wait for a period of time before initiating transmission of said second PPT beacon signal.

23. The first peer device as recited in claim 22, wherein said period of time comprises a random period of time.

24. The first peer device as recited in claim 19, wherein said first PPT beacon signal is transmitted at a first transmission power level, and if transmitted said second PPT beacon signal is transmitted at a second transmission power level that is different than said first transmission power level.

25. The first peer device as recited in claim 19, said processing unit to initiate transmission of at least said second PPT beacon signal if an acknowledgment message from said another device ending said peer-to-peer positioning operation has not been received.

26. The first peer device as recited in claim 19, said communication interface to receive location information from said another device, said location information identifying a location of said first peer device as determined, at least in part, by said peer-to-peer positioning operation.

27. The first peer device as recited in claim 26, wherein said location information has been encrypted.

28. An article comprising:
a non-transitory computer readable medium having computer implementable instructions stored thereon which are executable by one or more processing units in a first peer device to:
access information received via a peer-to-peer trilateration (PPT) request message broadcast from another device over a wireless communication link to at least said first peer device and at least a second peer device as part of a peer-to-peer positioning operation in which said first peer device participates by transmitting one or more PPT beacon signals to at least said second peer device, and wherein said PPT request message is indicative to at least said second peer device to participate in said peer-to-peer positioning operation by preparing to receive said at least one PPT beacon signal from said first peer device; and
based, at least in part thereon:
initiate transmission of at least a first PPT beacon signal to at least said second peer device during at least a first portion of a first assigned time slot, and
in response to a determination that said peer-to-peer positioning operation has not ended, initiate transmission of at least a second PPT beacon signal to at least said second peer device during at least a second portion of said first assigned time slot or at least a portion of a second assigned time slot, and wherein said first peer device comprises a target mobile station having a currently unknown location and said second peer device comprises a nomadic mobile station.

29. The article as recited in claim 28, wherein said another device comprises at least one of a base station, a dedicated peer device, or a network resource.

30. The article as recited in claim 28, wherein said PPT request message identifies at least one of said first assigned time slot and/or said second assigned time slot.

31. The article as recited in claim 28, said computer implementable instructions being further executable to:
wait for a period of time before initiating transmission of said second PPT beacon signal.

32. The article as recited in claim 31, wherein said period of time comprises a random period of time.

33. The article as recited in claim 28, wherein said first PPT beacon signal is transmitted at a first transmission power level, and if transmitted said second PPT beacon signal is transmitted at a second transmission power level that is different than said first transmission power level.

34. The article as recited in claim 28, said computer implementable instructions being further executable to:
   initiate transmission of at least said second PPT beacon signal if an acknowledgment message from said another device ending said peer-to-peer positioning operation has not been received.

35. The article as recited in claim 28, said computer implementable instructions being further executable to:
   obtain location information identifying a location of said first peer device as determined, at least in part, by said peer-to-peer positioning operation.

36. The article as recited in claim 35, wherein said location information has been encrypted.

\* \* \* \* \*